Patented June 12, 1951

2,556,255

UNITED STATES PATENT OFFICE 2,556,255

TREATING TUNGSTATE SOLUTIONS CONTAINING AS IMPURITIES ONE OR MORE COMPOUNDS OF ANTIMONY, ARSENIC, OR MOLYBDENUM

Michael C. Carosella, Niagara Falls, N. Y., assignor, by mesne assignments, to Union Carbide and Carbon Corporation, a corporation of New York No Drawing. Application March 7, 1947, Serial No. 733,198

9 Claims. (Cl. 23—18)

This invention relates to the preparation of alkaline earth metal tungstates and refers more particularly to a novel method for precipitating such tungstates, in a form substantially free from antimony, arsenic and molybdenum, from aqueous solutions of soluble tungstates which may contain one or more compounds of such elements.

Solutions of soluble tungstates containing minor proportions of soluble compounds of antimony, arsenic or molybdenum are obtained, for instance, during the extraction of tungsten from certain tungsten ores. One such extraction process comprises leaching impure scheelite with an aqueous solution of sodium carbonate at a high temperature and under super-atmospheric pressure. The resulting leach liquor ordinarily contains sodium tungstate, sodium carbonate, sodium bicarbonate and sodium salts of acidic compounds of antimony, arsenic or molybdenum.

The carbonate and bicarbonate may be decomposed readily by adding a mineral acid, the pH of the liquor being suitably between 1 and 6, although it need not ordinarily be below 4, the liquor preferably being warm or hot. The tungsten may be precipitated as calcium tungstate but the direct precipitation of calcium tungstate by the addition of lime or other soluble calcium compound to a solution containing sodium tungstate and soluble compounds of antimony, arsenic or molybdenum will result in a tungstate contaminated with antimony, arsenic or molybdenum compounds, in some instances to an extent detracting from its value. Calcium tungstate for use as a metallurgical intermediate, for instance, must ordinarily contain less than 0.1% and preferably less than 0.05% antimony, less than 0.05% arsenic and less than 0.30% molybdenum.

The present invention is a method of treating an aqueous solution containing soluble tungstate and soluble thiosalt-forming compounds of antimony, arsenic or molybdenum, which method comprises adjusting the pH of the solution (measured at about 25° C.) to between 5 and 8, adding a soluble sulfide in an amount at least equal to, and preferably in substantial excess of that theoretically required to combine with all of the compounds of antimony, arsenic or molybdenum present in the solution to form thiosalts thereof, and then adding a soluble compound of an alkaline earth metal to the solution to precipitate an alkaline earth metal tungstate substantially free from antimony, arsenic or molybdenum, and adjusting and maintaining the pH of the solution between 8 and 11.5 (preferably between 8 and 10.5) during both the sulfiding step and the tungsten precipitation step.

The tungstate starting solution to be treated is preferably free from carbonates and bicarbonates, the latter materials being decomposed, if present, as described above.

The pH of the solution after the decomposition of carbonates and bicarbonates may be adjusted to between 5 and 8 by the addition of sodium or potassium hydroxide or by lime additions if not much lime is thereby introduced.

The soluble sulfide may be hydrogen sulfide or ammonium sulfide but is preferably an alkali metal sulfide, sodium hydrogen sulfide being particularly efficacious. For convenience, the sulfide may be added as an aqueous solution.

Although a concentration of sulfide providing three atoms of sulfur for each atom of antimony, four atoms of sulfur for each atom of arsenic and four atoms of sulfur for each atom of molybdenum is sufficient to prevent precipitation of large quantities of the antimony, arsenic or molybdenum as indicated by the following typical equations, it is preferred that four to eight atoms of sulfur be provided for each atom of these elements. That is, if the solution to be treated contains one atom each of antimony, arsenic and molybdenum, between twelve and twenty-four atoms of sulfur ought to be provided.

*For antimony*

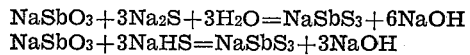
NaSbO₃+3Na₂S+3H₂O=NaSbS₃+6NaOH
NaSbO₃+3NaHS=NaSbS₃+3NaOH

*For arsenic*

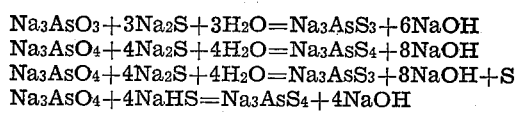
Na₃AsO₃+3Na₂S+3H₂O=Na₃AsS₃+6NaOH
Na₃AsO₄+4Na₂S+4H₂O=Na₃AsS₄+8NaOH
Na₃AsO₄+4Na₂S+4H₂O=Na₃AsS₃+8NaOH+S
Na₃AsO₄+4NaHS=Na₃AsS₄+4NaOH

*For molybdenum*

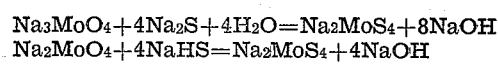
Na₃MoO₄+4Na₂S+4H₂O=Na₂MoS₄+8NaOH
Na₂MoO₄+4NaHS=Na₂MoS₄+4NaOH

As shown by the above reactions, one of the products of the sulfiding step is sodium hydroxide. Sodium hydroxide is also produced during precipitation of tungsten if lime is used as the reactant. Since the pH of the solution during the sulfiding and tungsten precipitation steps is quite critical, at least insofar as recovery of tungsten is concerned and particularly in the case of solutions containing arsenic or molybdenum or both, the quantity of sodium hydroxide or potassium hydroxide, or other base used to adjust the pH of the solution prior to the sulfiding step and the quantity of lime added during tungsten precipitation should be such that the pH of the solution does not rise to a value more than 11.5. Preferably the pH in the presence of arsenic or molybdenum or both should be not more than 10.5. The quantity of sulfide added should be considerably in excess of that required by the reactions set forth.

It is preferred that the solution to be treated be hot throughout the treatment, it being particularly desirable that the tungstate be precipitated while the solution is at a temperature between about 65° C. and its boiling point. Suitable alkaline earth metal compounds for precipitating the tungsten are lime, milk of lime (calcium hydroxide) and calcium chloride, or a solution thereof. Calcium chloride is preferred for the treatment of solutions containing arsenic or molybdenum or both because its use does not give rise to the formation in the solution of sodium hydroxide.

In a typical instance of the practice of this invention for the separation of tungsten from antimony, the solution to be treated contained 75 grams per liter of $WO_3$ as sodium tungstate, 1.45 grams per liter of antimony as sodium antimonate, 82 grams per liter of sodium carbonate, and 44 grams per liter of sodium bicarbonate. The carbonates were decomposed by adding sulfuric acid to a pH of 5.6, the pH of the solution was then adjusted to 7.0 by the addition of sodium hydroxide, and the solution was somewhat diluted and heated to 70° C. For purposes of comparison, portions of the solution were separated, one being directly treated with lime to precipitate calcium tungstate, and another being first treated with 2.65 gram mols of sodium hydrogen sulfide for each gram atom of antimony and then treated with lime. The calcium tungstate contained 0.87% antimony in the first instance, and 0.33% antimony in the second instance. Two further portions of the solution were treated according to the invention: to one was added 3.52 gram mols, and to the other 6.81 gram mols, of sodium hydrogen sulfide for each gram atom of antimony, and to each was added enough lime to precipitate the tungsten as calcium tungstate. In both instances the calcium tungstate contained only 0.09% antimony.

In other instances of the practice of the invention, portions of a solution having a pH of 7.5 and containing 72 parts by weight of tungstic oxide as sodium tungstate and 1.13 parts of antimony as sodium antimonate were treated with, respectively, 4.66 and 6.84 gram mols of sodium hydrogen sulfide for each gram atom of antimony. After addition of lime, the calcium tungstate precipitated from the former portion contained 0.03% antimony and that from the latter portion 0.012% antimony.

In a laboratory test of the method of this invention, as applied to the separation of tungsten from arsenic and molybdenum 1500 cc. of a solution containing 48.3 grams per liter of tungstic oxide ($WO_3$) as sodium tungstate, 0.25 gram per liter of arsenic and 1.94 grams per liter of molybdenum were acidified by the addition of sulfuric acid to a pH of 5.9 and heated to expel carbon dioxide. The pH of the solution at this point was 5.9. To the solution was then added 68 grams of sodium sulfide (32.5% $Na_2S$) and the pH of the solution was adjusted to approximately 9.6 by the addition of sodium hydroxide. The tungsten was then precipitated by the addition of 118% of the theoretically required quantity of calcium chloride necessary to combine with all of the tungsten in the solution to form calcium tungstate. The temperature of the solution during the precipitation (which took three and one-half hours) was between 75° C. and 85° C. Substantially complete recovery of the tungsten was attained, 99% of the tungsten originally present in the starting solution being precipitated in the form of calcium tungstate containing 77.12% tungstic oxide ($WO_3$), 0.04% arsenic, 0.25% molybdenum and 0.38% sulfur.

In a typical commercial scale operation conducted in accordance with the invention, 9,030 gallons of a solution having a pH of 7.5, containing 1,340 pounds of tungstic oxide, 7.6 pounds of arsenic, and 32 pounds of molybdenum, were heated to 85° C., and 600 pounds of a 60% solution of sodium sulfide were added. A further addition of 390 pounds of sodium hydroxide was then made to adjust the pH to 9.1. The tungsten was then precipitated from the solution, which was maintained at a temperature of about 85° C., over a period of three hours by the addition of 900 pounds of 80% calcium chloride. The calcium tungstate produced contained 77.29% tungstic oxide, ($WO_3$), 0.004% arsenic, 0.04% molybdenum and 0.24% sulfur. The tail liquor contained 9.5 pounds of tungstic acid, which was not recovered.

In other tests of the invention conducted in a manner similar to that described except at varying levels of pH during the sulfiding and tungsten precipitation steps it was demonstrated that tungsten can be separated from antimony over the pH range 8 to 11.5 but that the pH need not exceed about 9. It was also shown that tungsten can be separated from arsenic and molybdenum at a pH of about 8 to 10.5. In the latter tests, however, it was evident that for substantially complete recovery of tungsten the pH of the solution ought to be maintained at 9 to 10 or 10.5. For instance in the presence of arsenic or molybdenum or both, when the separation is conducted at pH 8.7, tungsten recovery is about 87% as compared to the 95% or better recovery attained when the separation is conducted at pH 9 or above.

As used in the appended claims, "sulfide" includes not only the normal sulfide, but also the hydrosulfide and polysulfide. Although the reactions given above indicate that arsenic, for example, is present as a simple sodium salt, it is possible that the element may be present as sodium arsenite or sodium arsenate, or sodium hydrogen arsenite or sodium hydrogen arsenate, or other arsenic compound. Similarly antimony and molybdenum may be present in the form of compounds other than those set forth in the reactions. However, the invention is applicable to the treatment of tungstate solutions containing any soluble compounds of these elements capable of forming thiosalts.

This application is in part a continuation of application Serial No. 533,251 filed April 28, 1944, now abandoned, and of application Serial No. 691,407, filed August 17, 1946, now abandoned.

I claim:
1. The method of treating an aqueous solution containing a soluble tungstate and, as an impurity, at least one soluble thiosalt-forming compound of an element of the group consisting of antimony, arsenic and molybdenum, which method comprises adjusting the pH of such solution to between 5 and 8, adding a soluble sulfide in substantial excess of the stoichiometric proportion sufficient to react with substantially all of said thiosalt-forming compound present in said solution, adjusting the pH of said solution during the addition of said sulfide to between 8 and 11.5, maintaining the solution at an elevated temperature below its boiling point, and adding a soluble alkaline earth metal compound to precipitate alkaline earth metal tungstate substantially free from said thiosalt-forming compound while maintaining the pH of the solution between 8 and 11.5

2. The method of treating an aqueous solution containing a soluble tungstate and a soluble arsenic compound which method comprises adjusting the pH of said solution to between 5 and 8, adding an alkali metal sulfide in an amount substantially in excess of that theoretically required to react with all of said arsenic compound to form thiosalts thereof, adjusting the pH of said solution during the addition of said sulfide to between 8 and 10.5, maintaining the solution at an elevated temperature below its boiling point, and adding a soluble alkaline earth metal compound in substantial excess of that theoretically required to combine with all of the tungstate in said solution to precipitate therefrom calcium tungstate substantially free from said arsenic compound, while maintaining the pH of the solution between 8 and 10.5

3. The method of treating an aqueous solution containing a soluble tungstate and a soluble arsenic compound, which method comprises adjusting the pH of such solution to between 5 and 8, adding an alkali metal sulfide in an amount substantially in excess of that theoretically required to react with all of said arsenic compound to form thiosalts thereof, adjusting the pH of said solution during the addition of said sulfide to between 9 and 10, maintaining the solution at a temperature between about 65° C. and its boiling point and adding calcium chloride in substantial excess of that theoretically required to combine with all of the tungstate in said solution, while maintaining the pH of the solution between 9 and 10, to precipitate therefrom substantially all of the tungstate as calcium tungstate substantially free from said arsenic compound.

4. The method of treating an aqueous solution containing a soluble tungstate and a soluble molybdenum compound, which method comprises adjusting the pH of such solution to between 5 and 8, adding an alkali metal sulfide in an amount substantially in excess of that theoretically required to react with all of said molybdenum compound to form thiomolybdate, adjusting the pH of said solution during the addition of said sulfide to between 8 and 10.5, maintaining the solution at an elevated temperature below its boiling point and adding a soluble alkaline earth metal compound in substantial excess of that theoretically required to combine with all of the tungstate in said solution to precipitate therefrom calcium tungstate substantially free from molybdenum compounds, while maintaining the pH of the solution between 8 and 10.5.

5. The method of treating an aqueous solution containing a soluble tungstate and a soluble molybdenum compound, which method comprises adjusting the pH of such solution to between 5 and 8, adding sodium sulfide in an amount substantially in excess of that theoretically required to react with all of said molybdenum compound to form thiomolybdate, adjusting the pH of said solution during the addition of said sulfide to between 9 and 10, maintaining the solution at a temperature between about 65° C. and its boiling point and adding calcium chloride in substantial excess of that theoretically required to combine wtih all of the tungstate in said solution to precipitate therefrom substantially all of the tungstate as calcium tungstate substantially free from molybdenum compounds, while maintaining the pH of the solution between 9 and 10.

6. The method of treating an aqueous solution containing a soluble tungstate and a soluble antimony compound to precipitate alkaline earth metal tungstate substantially free from antimony compounds, which method comprises adjusting the pH of such solution to between 5 and 8, adding an alkali metal sulfide and adjusting the amount thereof to provide at least three atoms of sulfur for each atom of antimony in said solution, whereby to form a soluble sulfur-containing alkali metal salt of an antimony acid, adjusting the pH of the solution during the addition of said sulfide to between 8 and 11.5, maintaining the solution at an elevated temperature below its boiling point, and adding a soluble alkaline earth metal compound to precipitate alkaline earth metal tungstate substantially free from antimony compounds, while maintaining the pH of the solution between 8 and 11.5.

7. The method of treating an aqueous solution containing alkali metal tungstate and alkali metal antimony compound to precipitate alkaline earth metal tungstate substantially free from antimony compounds, which method comprises adjusting the pH of such solution to between 5 and 8, adding an alkali metal sulfide in substantial excess of the amount required to provide three atoms of sulfur for each atom of antimony present in said solution, whereby to form a soluble sulfur-containing alkali metal salt of an antimony acid, adjusting the pH of the solution during the addition of said sulfide to between 8 and 10, maintaining the solution at a temperature between 65° C. and its boiling point, and adding a soluble alkaline earth metal compound to precipitate alkaline earth metal tungstate substantially free from antimony compounds, while maintaining the pH of the solution between 8 and 10.

8. The method of treating an aqueous solution of sodium tungstate and sodium antimonate, to precipitate calcium tungstate substantially free from antimony compounds, which comprises adjusting the pH of such solution to between 5 and 8, adding sodium hydrogen sulfide in an amount sufficient to provide from three to eight atoms of sulfur for each atom of antimony in said solution, whereby to form a soluble, sulfur-containing sodium salt of an antimony acid, adjusting the pH of the solution during the addition of said sulfide to between 8 and 10, maintaining the solution at a temperature between 65° and 95° C., and adding a calcium compound selected from the group consisting of calcium oxide, calcium hydroxide, and calcium chloride, to precipitate calcium tungstate, substantially free from antimony compounds, while maintaining the pH of the solution between 8 and 10.

9. Method of treating an aqueous solution of sodium tungstate, sodium antimonate, and sodium carbonate, to precipitate calcium tungstate substantially free from antimony compounds, which comprises acidifying the solution to a pH between 1 and 6 to decompose the carbonate, then adjusting, by the addition of sodium hydroxide where necessary, the pH of the solution to between 5 and 8, adding sodium hydrogen sulfide in an amount sufficient to provide from four to eight atoms of sulfur for each atom of antimony in said solution, and to adjust the pH of the solution to between 8 and 10 whereby to form a soluble sulfur-containing sodium salt of an antimony acid, maintaining the solution at a temperature between 65° and 95° C. and adding an aqueous solution of lime to precipitate calcium tungstate substantially free from antimony compounds while maintaining the pH of the solution between 8 and 10.

MICHAEL C. CAROSELLA.

REFERENCES CITED

The following references are of record in the file of this patent:

UNITED STATES PATENTS

| Number | Name | Date |
|---|---|---|
| 880,752 | Patten et al. | Mar. 3, 1908 |
| 1,796,026 | Iredell | Mar. 10, 1951 |
| 2,339,888 | Smith | Jan. 25, 1944 |
| 2,351,678 | Hall | June 20, 1944 |

FOREIGN PATENTS

| Number | Country | Date |
|---|---|---|
| 11,827 | Great Britain | of 1884 |

OTHER REFERENCES

Mellor, "Comprehensive Treatise on Inorganic and Theoretical Chemistry," vol. 9, page 553 (1929), Longmans, Green and Co., New York.